United States Patent [19]

Hannan, III

[11] Patent Number: 4,935,650
[45] Date of Patent: Jun. 19, 1990

[54] MAGNETOHYDRODYNAMIC TURBOMACHINE CONSTRUCTION FOR ELECTRIC MOTORS AND GENERATORS

[75] Inventor: William F. Hannan, III, Monroeville Boro, Pa.

[73] Assignee: Westinghouse Electric Corp., Pittsburgh, Pa.

[21] Appl. No.: 412,236

[22] Filed: Sep. 25, 1989

[51] Int. Cl.⁵ .................... H02N 3/00; H02K 44/14
[52] U.S. Cl. .................................. 310/11; 290/52; 310/178; 417/50
[58] Field of Search .................... 60/325; 290/1 R, 2, 290/52; 310/11, 178; 417/50

[56] References Cited

U.S. PATENT DOCUMENTS

| | | | |
|---|---|---|---|
| 2,938,000 | 6/1961 | Blake . | |
| 3,217,190 | 11/1965 | McLafferty | 310/11 |
| 3,428,836 | 2/1969 | Klein | 310/11 |
| 4,212,592 | 7/1980 | Olich et al. | 417/50 |
| 4,463,555 | 8/1984 | Wilcoxson | 60/325 |
| 4,687,418 | 8/1987 | Gotou et al. | 417/50 |

FOREIGN PATENT DOCUMENTS

| | | | |
|---|---|---|---|
| 590984 | 4/1959 | Italy | 417/50 |
| 239816 | 11/1945 | Switzerland | 417/50 |
| 528071 | 10/1940 | United Kingdom | 417/50 |
| 0928836 | 6/1963 | United Kingdom . | |

Primary Examiner—Patrick R. Salce
Assistant Examiner—Donald L. Rebsch
Attorney, Agent, or Firm—J. C. Spadacene

[57] ABSTRACT

A MHD turbomachine includes a rotary ferromagnetic rotor, a stationary ferromagnetic stator surrounding the rotor and defining axially-spaced annular cavities which extend circumferentially about and radially from the rotor, and axially-spaced annular ferromagnetic disks surrounding the rotor and mounted for rotation with the rotor. The disks are disposed in the stator cavities so as to define a pair of annular passages on opposite sides of each disk which are connected in flow communication with one another at inner and outer peripheries of the disk. An electrically conductive fluid occupies the passages and is capable of flowing along an endless path through the passages. A pair of electrodes mounted to the stator radially conduct a flow of electrical current through the fluid between the outer and inner peripheries of the disk. A field coil mounted to the stator generates a magnetic field in axial relation to the stator and disk and transversely across the fluid within the passages. Separate turbine stages disposed adjacent the outer and inner peripheries of the disk extend transversely across the endless path of fluid flow for causing transfer of momentum from the disk to the fluid in an electric generator operating mode of the turbomachine, for producing electrical power, or from the fluid to the disk in an electric motor operating mode of the turbomachine, for producing mechanical power.

30 Claims, 3 Drawing Sheets

MAGNETOHYDRODYNAMIC TURBOMACHINE CONSTRUCTION FOR ELECTRIC MOTORS AND GENERATORS

BACKGROUND OF THE INVENTION

1. Field of the Invention

The present invention relates generally to the field of magnetohydrodynamic (MHD) machines and, more particularly, is concerned with a MHD turbomachine construction for electric motor and generators.

2. Description of the Prior Art

A homopolar dc motor or generator is inherently a high current, low voltage device. In a typical homopolar machine, the conductor is rotated at as high a speed as practical, utilizing a high current flow, and the magnetic field traversed by the moving conductor is made as large as practical, maximizing the resulting voltage. Although the desire is to transmit power through these machines using a high voltage, nonetheless the resulting output voltage is relatively low.

The output voltage developed is proportional to the following parameters: the magnetic flux field (B); the length (L) of the conductor traversing the magnetic field; and the transverse or tangential velocity (V) of the conductor through the magnetic field. In a typical homopolar machine, there are practical limits on each of the above parameters, B, L and V. In other words, increasing any one of these parameters has practical limitations.

For instance, the capability of increasing the magnitude of magnetic field is ultimately limited by reaching the saturation point of the iron core of the homopolar machine. Increasing the effective length of the conductor, such as by use of multiple, nested armature circuits, disadvantageously increases the weight of and the space occupied by the machine. Further, such circuits presently employ current collection devices at each end of the conductor which easily exhaust space requirements. In the case of solid current collectors, an increase in frictional forces at the contact interface between the brushes and slip rings of the homopolar machine provides practical limits to the ability to increase the tangential velocity of the conductor through the magnetic field. Conventional liquid metal current collectors have similar limits imposed by viscous loss.

In summary, the two major problems in the design of high power density dc machines are the maximization of the length and velocity of a conductor traversing a magnetic field, and the construction of current collection systems to transmit current from rotating to stationary conductors. Finding solutions to these problems is a long-felt need and presents a difficult challenge.

SUMMARY OF THE INVENTION

The present invention provides a MHD turbomachine construction designed to satisfy the need and meet the challenge. Underlying the present invention is the recognition by the inventor herein that the principles of operation of a compressible vortex generator can be applied in the construction of a MHD turbomachine to produce the desired features of a high peripheral or tangential conductor velocity while simultaneously presenting a very long active length of conductor. The vortex generator is a liquid metal device that imparts momentum into a fluid stream constrained within an annular cavity. The operation of such a device is common in MHD and is explained by Hughes and Brighton in the book entitled "Theory and Problems of Fluid Dynamics". Such principles of operation of the vortex generator are useful in imparting or extracting momentum into or from a fluid stream by action of the J x B body forces. If this fluid stream is subsequently directed through a turbomachine turbine system designed to recover the fluid momentum, useful mechanical work can be performed. Therefore, the MHD turbomachine is capable of acting as a dc motor. Alternatively, it is capable of acting as a dc generator.

The avoidance of using a conventionally designed high speed current collection system is a major accomplishment of the present invention. The current collection system of the MHD turbomachine construction of the invention substitutes flooded liquid contact in place of metal-to-metal rubbing contact by forming suitable electrode surfaces at the outer and inner radii of the machine, which is much easier to accomplish than the current collection systems required on present homopolar machines.

Accordingly, the present invention is directed to a MHD turbomachine operable in an electric motor mode for converting electrical to mechanical energy or in an electric generator mode for converting mechanical to electrical energy. The turbomachine comprises: (a) a rotary non-ferromagnetic rotor; (b) a stationary ferromagnetic stator surrounding the rotor and defining at least one annular cavity extending circumferentially about and radially from the rotor; (c) an annular ferromagnetic disk surrounding the rotor and mounted thereto for rotation therewith and disposed in the annular cavity of the stator so as to define a pair of radially-extending annular passages within the cavity located on opposite sides of the disk and connected in flow communication with one another at inner and outer peripheries of the disk; (d) an electrically conductive fluid, such as a liquid metal, occupying the passages and capable of flowing along an endless path through the passages in the same given circumferential direction and in opposite radial directions concurrently with rotation of the rotor in the given circumferential direction; (e) means for radially conducting a flow of electrical current through the fluid between the outer and inner peripheries of the disk; (f) means for generating a magnetic field in axial relation to the stator and disk and transversely across the fluid within the passages; and (g) means disposed adjacent the outer and inner peripheries of the disk and extending transversely across the endless path of fluid flow for transferring momentum from the disk to the fluid in the generator operating mode of the turbomachine for producing electrical power or from the fluid to the disk in the motor operating mode of the turbomachine for producing mechanical power.

More particularly, the momentum transferring means includes inner and outer impulse turbine stages each disposed respectively adjacent the inner and outer peripheries of the disk. Each of the turbine stages is preferably in the form of a plurality of turbine blades spaced circumferentially from one another about the respective periphery of the disk, such as is employed in conventional turbomachines. Also, the current conducting means includes a pair of stationary electrodes disposed in electrical contact with the fluid in the passages. One electrode is mounted to the stator adjacent the outer periphery of the disk and the other electrode is mounted to the stator adjacent the inner periphery of the disk. Each electrode is electrically insulated from the stator These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
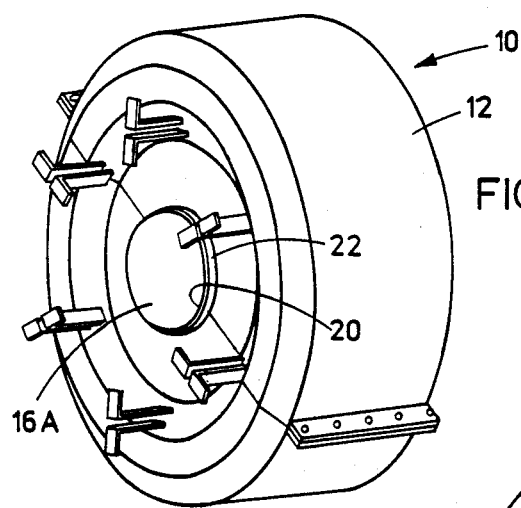
FIG. 1 is a perspective view of the non-drive end of a MHD turbine motor in accordance with the present invention.
Figure 2:
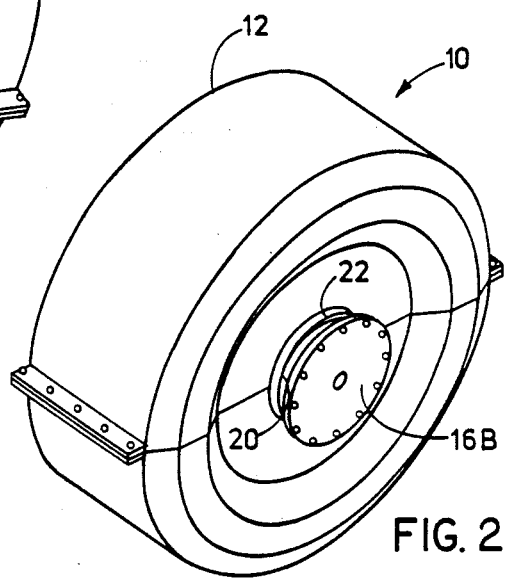
FIG. 2 is another perspective view of the drive end of the MHD turbine motor of FIG. 1.
Figure 3:
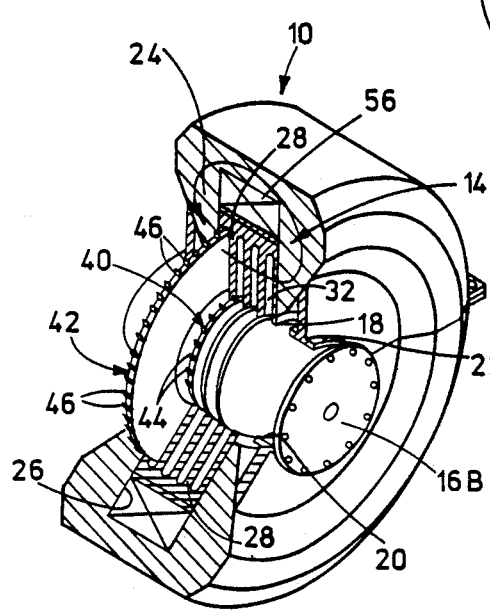
FIG. 3 is a view similar to FIG. 2 with portions of the MHD turbine motor broken away and sectioned.

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIGS. 1-5, there is shown a MHD turbomachine, generally designated by the numeral 10, which operates in accordance with the principles of the present invention. The turbomachine 10 can function either in an electric motor mode for converting electrical to mechanical energy or in an electrical generator mode for converting mechanical to electrical energy.

Figure 4:
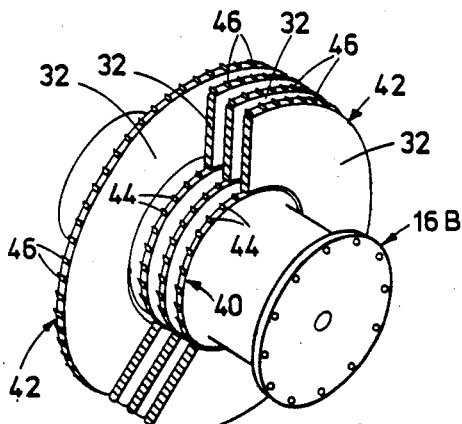
FIG. 4 is a perspective view of the MHD turbine motor rotor with portions broken away and sectioned as in FIG. 3.
Figure 5:
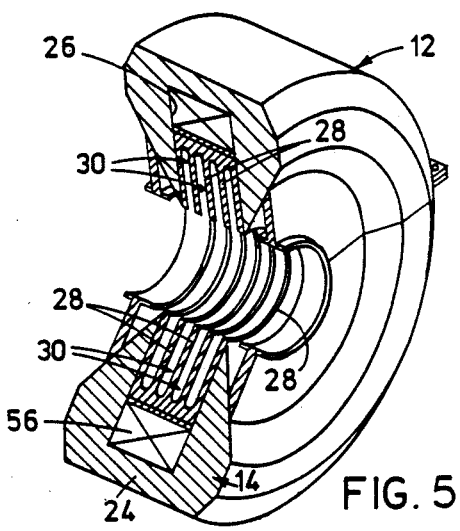
FIG. 5 is a perspective view of the MHD turbine motor stator with portions broken away and sectioned as in FIG. 3.

The MHD turbomachine 10 includes a cylindrical housing or casing 12, a stator 14 enclosed by and stationarily supported within the casing 12, and a rotor 16 rotatably mounted by the casing 12 for rotation relative to the stationary stator 14. The rotor 16 is shown in FIG. 4 separate from the casing 12 and stator 14, whereas the casing 12 and stator 14 are shown in FIG. 5 without the rotor 16. The stator 14 is annular in shape and has a central opening 18 through which extends the cylindrical-shaped rotor 16. The casing 12 has a pair of openings 20 at its opposite ends fitted with bearings 22 for rotatably mounting the rotor 16 at its non-drive end 16A, shown in FIG. 1, and opposite drive end 16B, shown in FIGS. 2 and 3.

Referring now to FIGS. 3-6, it can be seen that the stationary annular stator 14 includes an annular body 24 surrounding the rotor 16 and composed of a suitable ferromagnetic material. The stator body 24 has an annular chamber 26 defined therein and includes a structure in the form of a series of axially-spaced annular plates 28 seated in an inner circumferential portion of the chamber 26. The spaced plates 28 define between them a plurality of axially-spaced annular cavities 30 which extend circumferentially about and radially outwardly from the rotor 16.

Also, the MHD turbomachine 10 includes a plurality of axially-spaced annular rotor disks 32 surrounding and mounted for rotation with the rotor 16. The rotor disks 32 are composed of a suitable ferromagnetic material and are disposed in the respective cavities 30 of the stator 14. Additionally, the rotor disks 32 are less in thickness than the width of the respective cavities 30 of the stator 14 between the plates 28 thereof and less in diameter than the diameter of the cavities 30. Thus, each rotor disk 32 in conjunction with a pair of the stator plates 28 defines a pair of radially-extending annular passages 34, 36 within each cavity 30 and located on opposite sides 32A, 32B of the rotor disk 32 and the passages 34, 36 of each pair thereof are connected in flow communication with one another at both inner and outer peripheries 32C, 32D of the rotor disk 32. Annular sealing rings 38 are disposed at the inner peripheries 28A of the annular stator plates 28 and extend about and interface with axially-spaced cylindrical portions 16D of the rotor 16 aligned with the stator plates 28 so as to seal the annular stator cavities 30 from one another. Thus, each pair of the passages 34, 36 forms a closed loop or endless path about a given one rotor disk 32 and within a given one stator cavity 30.

Figure 6:
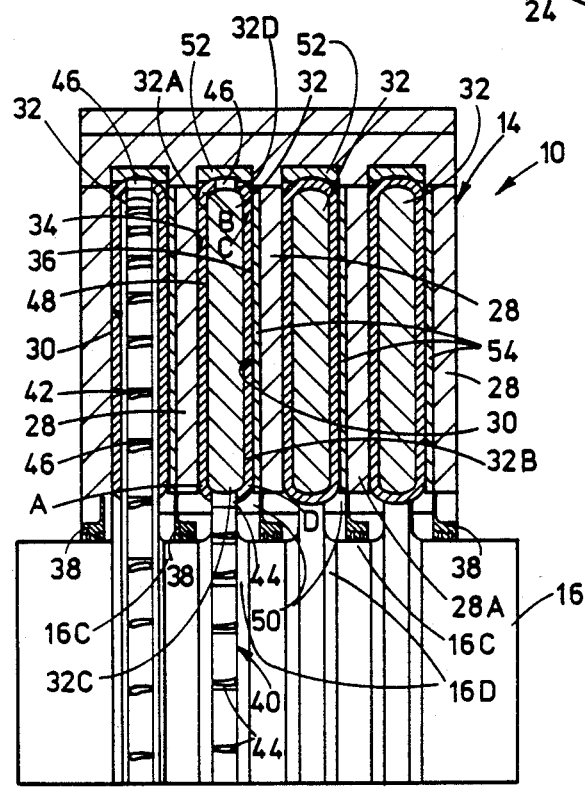
FIG. 6 is an enlarged fragmentary view of the upper portion of the MHD turbine motor of FIG. 3.
Figure 7:
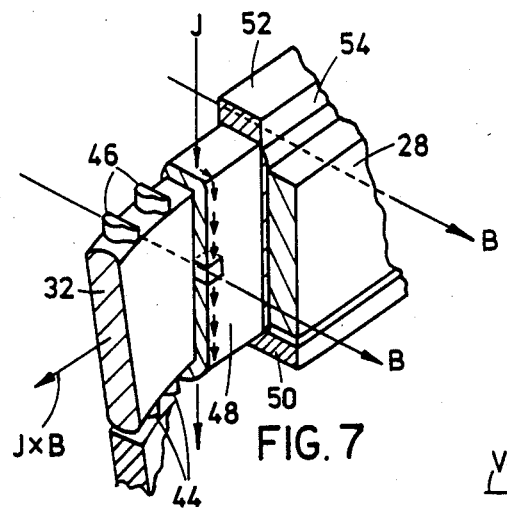
FIGS. 7 and 8 are schematic representations of the working fluid force definition of the MHD turbine motor of FIG. 3.
Figure 8:
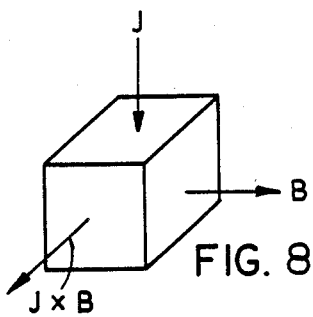

A plurality of pairs of separate inner and outer turbine stages 40, 42 are provided in the MHD turbomachine 10. The inner and outer turbine stages 40, 42 of each pair are respectively disposed adjacent the inner and outer peripheries 32C, 32D of one disk 32. More particularly, the inner and outer turbine stages 40, 42 are formed respectively by pluralities of turbine blades 44, 46 spaced circumferentially from one another about the respective peripheries 32C, 32D of the disk 32. As can be seen in FIG. 6, the blades 44, 46 are arcuate or crescent shaped with the blades 44 of the inner stage 40 being oriented 180° relative to the blades 46 of the outer stage 42. Preferably, the blades 44 of each inner stage 40 provide the rigid connection between one of the disks 32 and the rotor 16 at axially-spaced circumferential portions 16C thereof located between the portions 16D aligned with the stator plates 28. The disks 32 thus rotate with the rotor 16 due to the connections provided by the inner turbine blades 44.

Figure 11:
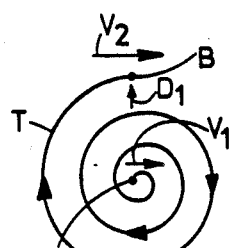
FIGS. 11 and 12 are simplified diagrammatic representations of the working fluid flow patterns in the MHD turbine motor of FIG. 3.
Figure 12:
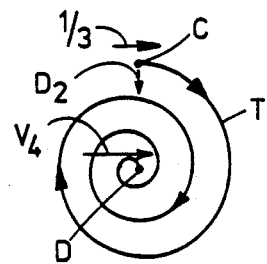
Figure 9:
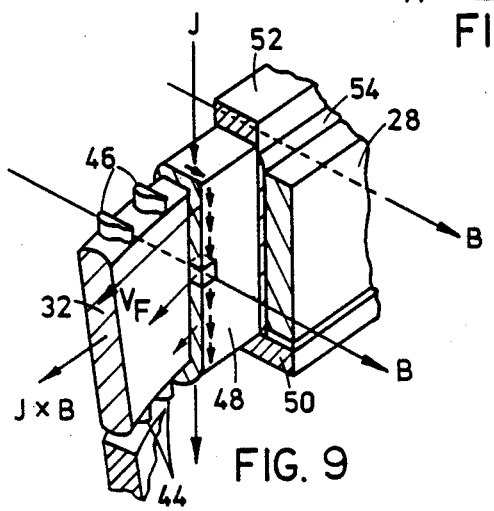
FIGS. 9 and 10 are schematic representations of the electromagnetics of the MHD turbine motor of FIG. 3.
Figure 10:
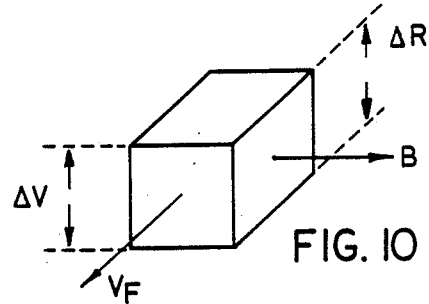

Further, the MHD turbomachine 10 includes a plurality of separate quantities of electrically conductive fluid 48, such as a suitable liquid metal. Each separate quantity of conductive fluid 48 occupies and fills one particular pair of the passages 34, 36 within one of the cavities 30. As depicted in FIGS. 11 and 12, the conductive fluid 48 is capable of recirculating along an endless path through the passages 34, 36, spirally flowing in the same given circumferential direction T but in opposite radial directions $D_1$, $D_2$ concurrently with rotation of the rotor 16 in the same given circumferential direction. The turbine blades 44, 46 of the inner and outer stages 40, 42 associated with each disk 32 extend transversely across the endless path of flow of the fluid 48 for causing transfer of momentum from the disk 32 to the fluid 48 in a generator operating mode of the turbomachine 10 for producing electrical power or from the fluid 48 to the disk 32 in a motor operating mode of the turbomachine 10 for producing mechanical power.

Also, electrical current conductors in the form of inner and outer annular electrodes 50, 52 are provided in the turbomachine 10 for radially conducting a flow of electrical current through the fluid 48 between the outer and inner peripheries of the disk 32. The pair of stationary electrodes 50, 52 are disposed in electrical contact with the fluid 48 circulating in the passages 34, 36. The outer electrode 52 is mounted to the stator 14 at the outer end of each cavity 30 and adjacent the outer periphery 32D of the disk 32, while the inner electrode 50 is mounted to the stator 14 adjacent the inner periphery 32C of the disk 32. Each electrode 50, 52 is electrically insulated from the stator 14 and rotor 16.

Further, the pairs of stationary inner and outer electrodes 50, 52 are connected to one another in series relation wherein the inner electrode 50 of one pair is electrically connected to the outer electrode 52 of the next pair by an annular conductor plate 54 extending along the one passage 36 of each pair thereof. The conductor plate 54 is electrically insulated by a coating (not shown) on the plate 54 from the fluid 48 in the passage 36 and from the adjacent portion of the stator 14 which mounts the plate 54.

Additionally, a field coil 56 is mounted by the stator 14 within the outer portion of the annular chamber 26 which surrounds the structure defining the annular stator plates 28. The field coil 56 is arranged to generate a magnetic field B (FIGS. 6–10) which is supported by the ferromagnetic stator body 24 and the ferromagnetic rotor disks 32 to extend in axial relation thereto and thus transversely across the fluid 48 within the passages 34, 36. When the turbomachine 10 is operated in the electric motor mode, as depicted in FIGS. 7–10, a flow of electrical current J is injected through the fluid 48 from the outer electrode 52 to the inner electrode 50 associated with each disk 32 in transverse relation to the magnetic field B. Interaction of the current flow J and magnetic field B produces a body force, J x B, in the circumferential direction T shown in FIGS. 11 and 12. The voltage, delta V, produced by the turbomachine 10 is a result of the particular fluid velocity, $V_F$, magnetic field, B, and radius of the current path, delta R.

Referring to FIGS. 6, 11 and 12, a recirculating flow of the fluid 48 will be established in the passages 34, 36 of each cavity 30. Beginning at point A in the left passage 34, the fluid possesses a low radial and low tangential velocity. The radial current J flowing through the fluid 48 in the presence of the transverse magnetic field B results in a peripheral acceleration acting on the fluid stream within the left annular passage 34. The tangential velocity has increased greatly as the fluid reaches point B, as indicated by the shorter length of the arrow $V_1$ at point A than that of the arrow $V_2$ at point B. A significant pressure rise also occurs on the fluid stream in passing from point A to B. The fluid stream then passes through the outer turbine blades 46 (FIG. 6), going from point B (FIG. 11) to point C (FIG. 12), where the change in fluid momentum causes a torque to occur on the turbine disk 32. The fluid at point C is now relatively slow moving (low tangential and radial velocity), as represented by the shorter arrow $V_3$, but is under high pressure. Directing this fluid stream through the right annular passage 36 will allow a controlled spin up of fluid, resulting in an efficient conversion of the high "pressure" energy into a high velocity at point D, as indicated by the greater length of the arrow $V_4$ than arrow $V_3$. This high velocity, low pressure fluid stream is then directed through the inner turbine blades 44 (FIG. 6), going from point D (FIG. 12) to point A (FIG. 11) where the change in fluid momentum causes a torque on the turbine disk 32 which augments the torque imposed thereon by the outer turbine blades 46. At this point, the cycle repeats.

Therefore, electrical energy is turned into fluid momentum which, in turn, is converted into mechanical work. When the turbomachine 10 is operating in an electric generator mode, a mechanical rotary input is supplied to rotate the rotor 16 and disks 32 and cause recirculation of the fluid 48 along the endless path as described above. Such recirculation of the conductive fluid 48 in the presence of the magnetic field B will cause generation of an electric current which will be collected by the electrodes 50, 52 and conductor plate 54.

To recapitulate, the MHD turbomachine 10 of the present invention provides a momentum input into a liquid metal fluid stream, such as NaK eutectic. The stream of liquid metal will then be used to power (or recover power from) a turbomachine turbine or compressor stage(s). This invention differs from the present state-of-the-art since the momentum input (or output) to the fluid stream is accomplished by J x B (Lorenz) body forces imposed upon the fluid, rather than the conventional nozzles, diffusers or airfoil blading used in conventional designs.

The resulting MHD turbomachine 10 will exhibit high power densities (typical of turbomachines) when compared to conventionally designed dc machines. These machines will result in higher voltage output per "stage" than a conventional homopolar, since the average fluid velocity and conductor length can be much larger than for machines with solid conductors. Additional advantages can be expected from these machines, since they employ simple current collection devices (as compared to high powered homopolar current collectors), minimizing one of the unattractive aspects of high power dc motors and generators.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A magnetohydrodynamic turbomachine operable in an electric motor mode for converting electrical to mechanical energy or in an electric generator mode for converting mechanical to electrical energy, said turbomachine comprising:
   (a) a rotary non-ferromagnetic rotor;
   (b) a stationary ferromagnetic stator surrounding said rotor and defining at least one annular cavity extending circumferentially about and radially from said rotor;
   (c) an annular ferromagnetic disk surrounding said rotor and mounted thereto for rotation therewith and disposed in said annular cavity of said stator so as to define a pair of radially-extending annular passages within said cavity located on opposite sides of said disk and connected in flow communication with one another at inner and outer peripheries of said disk;

(d) an electrically conductive fluid occupying said passages and capable of flowing along an endless path through said passages in the same given circumferential direction and in opposite radial directions concurrently with rotation of said rotor in the given circumferential direction;

(e) means for radially conducting a flow of electrical current through said fluid between said outer and inner peripheries of said disk;

(f) means for generating a magnetic field in axial relation to said stator and disk and transversely across said fluid within said passages; and (g) means disposed adjacent said outer and inner peripheries of said disk and extending transversely across said endless path of fluid flow for transferring momentum from said disk to said fluid in the generator operating mode of the turbomachine for producing electrical power or from said fluid to said disk in the motor operating mode of the turbomachine for producing mechanical power.

2. The turbomachine as recited in claim 1, wherein said momentum transferring means includes inner and outer turbine stages each disposed respectively adjacent said inner and outer peripheries of said disk.

3. The turbomachine as recited in claim 2, wherein each of said turbine stages is in the form of a plurality of turbine blades spaced circumferentially from one another about the respective periphery of said disk.

4. The turbomachine as recited in claim 1, wherein said current conducting means includes a pair of stationary electrodes disposed in electrical contact with said fluid in said passages, one electrode being mounted to said stator adjacent said outer periphery of said disk and the other electrode being mounted to said stator adjacent said inner periphery of said disk, each electrode being electrically insulated from said stator.

5. The turbomachine as recited in claim 1, wherein said conductive fluid is a liquid metal.

6. The turbomachine as recited in claim 1, wherein said stator defines a plurality of axially spaced annular cavities.

7. The turbomachine as recited in claim 6, further comprising:
a plurality of axially spaced annular ferromagnetic disks mounted to said rotor for rotation therewith and respectively disposed in said plurality of annular cavities of said stator so as to define said pair of annular passages within each of said cavities.

8. The turbomachine as recited in claim 7, further comprising:
a separate quantity of said conductive fluid occupying each of said pair of passages.

9. The turbomachine as recited in claim 8, wherein said current conducting means includes a plurality of pairs of stationary electrodes, each pair of electrodes being disposed adjacent one disk and in electrical contact with said fluid in one pair of passages, one electrode of said each pair being mounted to said stator adjacent said outer periphery of said one disk and the other electrode being mounted to said stator adjacent said inner periphery of said one disk, each electrode being electrically insulated from said stator.

10. The turbomachine as recited in claim 9, wherein said plurality of pairs of stationary electrodes are connected to one another in series relation wherein the one electrode of one pair is electrically connected to the other electrode of the next pair.

11. A magnetohydrodynamic turbomachine operable in an electric motor mode for converting electrical to mechanical energy, said turbomachine comprising:

(a) a rotary non-ferromagnetic rotor;

(b) a stationary ferromagnetic stator surrounding said rotor and defining at least one annular cavity extending circumferentially about and radially from said rotor;

(c) an annular ferromagnetic disk surrounding said rotor and mounted thereto for rotation therewith and disposed in said annular cavity of said stator so as to define a pair of radially-extending annular passages within said cavity located on opposite sides of said disk and connected in flow communication with one another at inner and outer peripheries of said disk;

(d) an electrically conductive fluid occupying said passages;

(e) means for radially conducting a flow of electrical current through said fluid between said outer and inner peripheries of said disk;

(f) means for generating a magnetic field in axial relation to said stator and disk and transversely across said fluid within said passages and said flow of electrical current therethrough so as to produce and impose a body force in and on said conductive fluid which causes circulation of said fluid about an endless path in the same given circumferential direction and in opposite radial directions through said respective passages; and (g) means disposed adjacent said outer and inner peripheries of said disk and extending transversely across said endless path of fluid flow for transferring momentum from said fluid to said disk to produce a torque thereon which causes rotation of said disk in the given circumferential direction of fluid circulation and thereby provides a source of mechanical power.

12. The turbomachine as recited in claim 11, wherein said momentum transferring means includes inner and outer impulse turbine stages each disposed respectively adjacent said inner and outer peripheries of said disk.

13. The turbomachine as recited in claim 12, wherein each of said turbine stages is in the form of a plurality of turbine blades spaced circumferentially from one another about the respective periphery of said disk.

14. The turbomachine as recited in claim 11, wherein said current conducting means includes a pair of stationary electrodes disposed in electrical contact with said fluid in said passages, one electrode being mounted to said stator adjacent said outer periphery of said disk and the other electrode being mounted to said stator adjacent said inner periphery of said disk, each electrode being electrically insulated from said stator.

15. The turbomachine as recited in claim 11, wherein said conductive fluid is a liquid metal.

16. The turbomachine as recited in claim 11, wherein said stator defines a plurality of axially spaced annular cavities.

17. The turbomachine as recited in claim 16, further comprising:
a plurality of axially spaced annular ferromagnetic disks mounted to said rotor for rotation therewith and respectively disposed in said plurality of annular cavities of said stator so as to define said pair of annular passages within each of said cavities.

18. The turbomachine as recited in claim 17, further comprising:
a separate quantity of said conductive fluid occupying each of said pair of passages.

19. The turbomachine as recited in claim 18, wherein said current conducting means includes a plurality of pairs of stationary electrodes, each pair of electrodes being disposed adjacent one disk and in electrical contact with said fluid in one pair of passages, one electrode of said each pair being mounted to said stator adjacent said outer periphery of said one disk and the other electrode being mounted to said stator adjacent said inner periphery of said one disk, each electrode being electrically insulated from said stator.

20. The turbomachine as recited in claim 19, wherein said plurality of pairs of stationary electrodes are connected to one another in series relation wherein the one electrode of one pair is electrically connected to the other electrode of the next pair.

21. A magnetohydrodynamic turbomachine operable in an electric generator mode for converting mechanical to electrical energy, said turbomachine comprising:
(a) a rotary non-ferromagnetic rotor;
(b) a stationary ferromagnetic stator surrounding said rotor and defining at least one annular cavity extending circumferentially about and radially from said rotor;
(c) an annular ferromagnetic disk surrounding said rotor and mounted thereto for rotation therewith and disposed in said annular cavity of said stator so as to define a pair of radially-extending annular passages within said cavity located on opposite sides of said disk and connected in flow communication with one another at inner and outer peripheries of said disk;
(d) an electrically conductive fluid occupying said passages;
(e) means for radially conducting a flow of electrical current through said fluid between said outer and inner peripheries of said disk;
(f) means for generating a magnetic field in axial relation to said stator and disk and transversely across said fluid within said passages; and
(g) means disposed adjacent said outer and inner peripheries of said disk and extending transversely across said endless path of fluid flow for transferring momentum from said disk to said fluid, upon rotation of said rotor in a given circumferential direction, to produce a torque on said fluid which causes circulation of said fluid about an endless path in the same given circumferential direction and in opposite radial directions through said respective passages and produces a flow of current through said fluid and between said peripheries of said disk and thereby provides a source of electrical power.

22. The turbomachine as recited in claim 21, wherein said momentum transferring means includes inner and outer impulse turbine stages each disposed respectively adjacent said inner and outer peripheries of said disk.

23. The turbomachine as recited in claim 22, wherein each of said turbine stages is in the form of a plurality of turbine blades spaced circumferentially from one another about the respective periphery of said disk.

24. The turbomachine as recited in claim 21, wherein said current conducting means includes a pair of stationary electrodes disposed in electrical contact with said fluid in said passages, one electrode being mounted to said stator adjacent said outer periphery of said disk and the other electrode being mounted to said stator adjacent said inner periphery of said disk, each electrode being electrically insulated from said stator.

25. The turbomachine as recited in claim 21, wherein said conductive fluid is a liquid metal.

26. The turbomachine as recited in claim 21, wherein said stator defines a plurality of axially spaced annular cavities 27. The turbomachine as recited in claim 26, further comprising:
a plurality of axially spaced annular ferromagnetic disks mounted to said rotor for rotation therewith and respectively disposed in said plurality of annular cavities of said stator so as to define said pair of annular passages within each of said cavities.

28. The turbomachine as recited in claim 27, further comprising:
a separate quantity of said conductive fluid occupying each of said pair of passages.

29. The turbomachine as recited in claim 28, wherein said current conducting means includes a plurality of pairs of stationary electrodes, each pair of electrodes being disposed adjacent one disk and in electrical contact with said fluid in one pair of passages, one electrode of said each pair being mounted to said stator adjacent said outer periphery of said one disk and the other electrode being mounted to said stator adjacent said inner periphery of said one disk, each electrode being electrically insulated from said stator.

30. The turbomachine as recited in claim 29, wherein said plurality of pairs of stationary electrodes are connected to one another in series relation wherein the one electrode of one pair is electrically connected to the other electrode of the next pair.

* * * * *